United States Patent Office 3,473,072
Patented Oct. 14, 1969

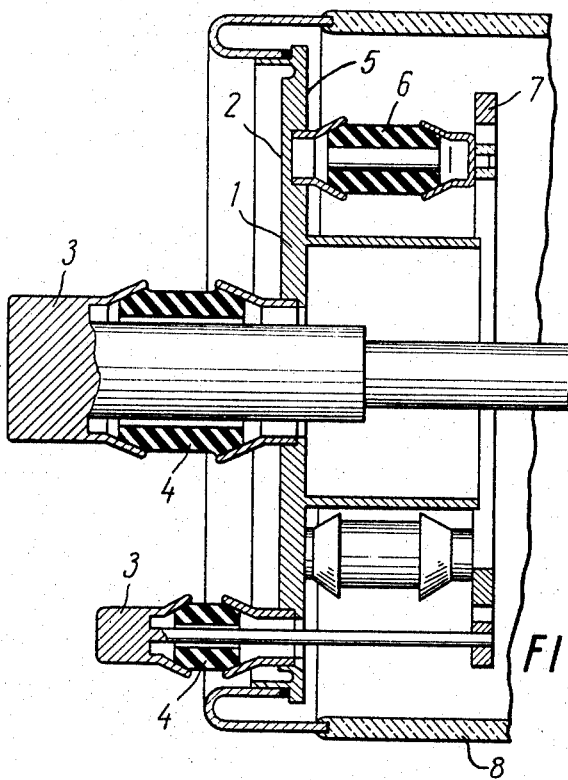
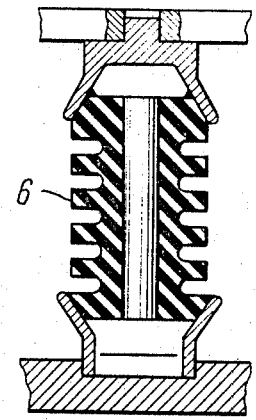
FIG. 2
FIG. 1
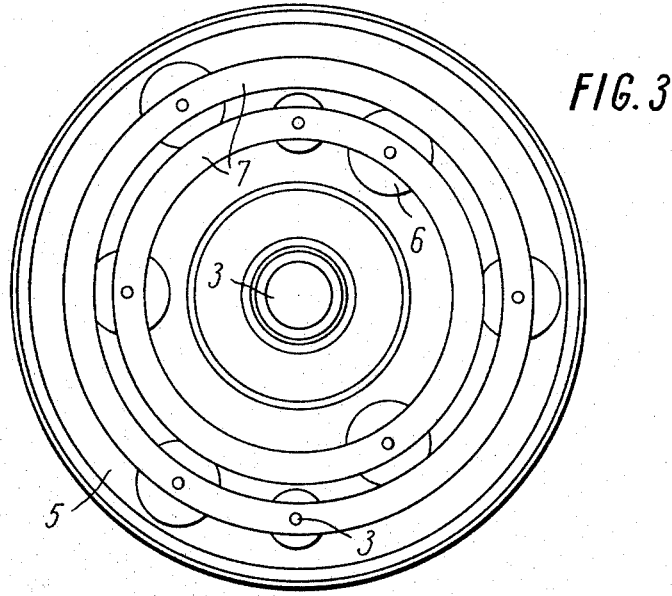
FIG. 3

3,473,072
MOUNT FOR ELECTRIC VACUUM DEVICES
Nikolai Dmitrievich Ivanov, Granitnaya ulitsa 46, korpus 1, kv. 31; Fridrikh Davydovich Kaminsky, Ulitsa Butlerova 18, kv. 86; and Vladimir Ilich Kuznetsov, Grazhdansky prospekt 15, korpus 4, kv. 56; all of Leningrad, U.S.S.R.
Filed Mar. 1, 1967, Ser. No. 619,725
Int. Cl. H01j 5/48, 5/50
U.S. Cl. 313—317                        2 Claims

ABSTRACT OF THE DISCLOSURE

A mount for an electronic vacuum device which constitutes a part of the casing of the electric vacuum device comprising a metal base through which electric leads extend to electrodes within the device. The electric leads are supported on the metal base by insulators on the exterior side of said metal base.

---

The present invention relates to electronic engineering and more particularly to mounts for electric vacuum devices, for example, medium and high-power oscillator and modulator devices in which the mount is a component constituting part of the casing of the electric vacuum device.

Mounts for electric vacuum devices are known which are provided on the external side of the metal base with pin leadouts for electrodes mounted in through insulators. On the internal side of the mount base electrodes are fixed on said leadouts.

These mounts are disadvantageous due to the necessity of having at least two vacuum-tight soldered leadouts for fixing each electrode, with the exception of the cathode, and also due to the impossibility of insuring a rigid fixing of the electrodes in such mounts due to the considerable length of the leadouts.

An essential disadvantage to the prior art mounts is that in case of mechanical or thermal effects to the electrodes of the device, all the stresses are transmitted to the seals between the leadouts and respective insulator, which impairs the dependability of the operation of the device.

It is an object of the present invention to provide a mount for electric vacuum devices which will make it possible to reduce the number of vacuum-tight soldered leadouts to one per electrode.

Another object of the present invention is to provide a mount for electric vacuum devices which will insure an increased mechanical strength of fixing of the electrodes.

Still another object of the present invention is to provide a mount for electric vacuum devices which will make it possible to relieve the seals between the leadouts and electrodes from stresses arising under mechanical and thermal effects on the electrodes of the device.

In accordance with the above and other objects of the present invention base insulators are provided for fixing the electrodes, with the insulators being fixed on the internal side of the metal base.

Other objects and advantages of the present invention will become more fully apparent upon consideration of the description of an exemplary embodiment thereof given below taken in conjunction with the accompanying drawings, wherein:

FIG. 1 is a view partly in elevation ad partly in longitudinal section of a mount embodying the invention;

FIG. 2 is a view in longitudinal section of a shaped base insulator of the mount according to the present invention; and FIG. 3 is an axial view of the mount of the invention, viz., the view of the internal side of the mount base.

The mount of the present invention is a part of casing 8 of the electric vacuum device and is provided with a copper base 1 (FIG. 1). On external side 2 of the base, pin leadouts 3 are fixed for the electrodes (not shown). The leadouts 3 are mounted in a vacuum-tight manner in ceramic through insulators 4. On internal side 5 of the base 1 ceramic base or electrode supporting insulators 6 are fixed. To reduce their conductivity, each insulator 6 may be made ribbed, as shown in FIG. 2. Insulators 6 and metal rings 7 are mounted on the base (FIG. 3) for fixing the electrodes. The number of the rings 7 depends on the number of electrodes of the device.

According to the invention, the mount is assembled as follows.

Leadouts 3 with insulators 4 are assembled on the external side 2 of the base 1. On the internal side 5 of the base 1 base insulators 6 with rings 7 are mounted. Then the mount is soldered together.

Base insulators 6 on the base 1 may be fixed without soldering, e.g., mechanically. The rings 7 on the base insulators may be fixed by means of electric arc welding.

The mount for electric vacuum devices disclosed above provides for rigid fixing of the electrodes, reduction of the number of vacuum-tight seals and an increase in the dependability of the seals between the leadouts and insulators. The proposed mount may be used in electric vacuum devices employing any number of electrodes.

The mount of the invention will make it possible to provide devices with greater mechanical strength and dependability size without increasing the overall size thereof.

Though the present invention is described in connection with the preferred embodiment thereof, various changes and modifications may be resorted to without departing from the spirit and scope of the invention, as those skilled in the art will easily understand. Such changes and modifications should be considered as falling within the spirit and scope of the invention and the appended claims.

What is claimed is:

1. A mounted for an electric vacuum device, having a casing, comprising a metal base constituting a part of the casing, said base having internal and external sides, base insulators rigidly fixed on the internal side of said base and serving for the attachment of electrodes of the electric vacuum device to the mount, at least one pin leadout for each of the electrodes, said leadouts extending through the metal base, means fixing said leadouts to the external side of said metal base, insulators secured to the external side of said metal base, and said pin leadouts having end portions passing onto the external side of said metal base and mounted in said insulators.

2. The mount for an electric vacuum device as claimed in claim 1 in which said base is of copper and said insulators are of ribbed ceramic material.

References Cited

UNITED STATES PATENTS

| | | | |
|---|---|---|---|
| 1,488,613 | 4/1924 | Pickard | 313—317 X |
| 2,071,597 | 2/1937 | Vasselli | 313—317 |
| 3,138,733 | 6/1964 | Smith | 313—289 X |
| 3,213,182 | 10/1965 | Rordorf | 313—281 X |
| 3,255,377 | 6/1966 | Sylvernal | 313—289 X |
| 3,379,823 | 4/1968 | Loose | 313—317 X |
| 3,388,279 | 6/1968 | Kelly | 313—326 X |

FOREIGN PATENTS 917,492    2/1963    Great Britain.

JOHN W. HUCKERT, Primary Examiner

ANDREW J. JAMES, Assistant Examiner

U.S. Cl. X.R.

313—250, 281, 288, 289